United States Patent [19]

Walser et al.

[11] Patent Number: 5,148,612
[45] Date of Patent: Sep. 22, 1992

[54] APPARATUS FOR MEASURING DISTANCES ON A WORKPIECE, AND SLIDING GAGE DESIGNED FOR THE DIGITAL MEASUREMENT OF SUCH DISTANCES

[75] Inventors: Carl S. Walser, Gamprin, Liechtenstein; Johann M. Jost, Richterswil, Switzerland

[73] Assignee: Industrie-und-Handels-AG, Liechtenstein

[21] Appl. No.: 530,466

[22] Filed: May 29, 1990

Related U.S. Application Data

[63] Continuation of Ser. No. 116,394, Nov. 3, 1987, abandoned.

[30] Foreign Application Priority Data

Nov. 3, 1986 [CH] Switzerland .................. 04350/86

[51] Int. Cl.$^5$ .................. G01B 3/20; G01B 7/14; G01B 5/14
[52] U.S. Cl. .................. 33/784; 33/796; 33/810; 33/DIG. 1
[58] Field of Search .................. 33/784, 810, 811, 812, 33/DIG. 1, 783, 427, 437, 449, 579, 806, 796, 795, 792, 791

[56] References Cited

U.S. PATENT DOCUMENTS

| | | | |
|---|---|---|---|
| 1,659,915 | 2/1928 | Hilfiker | 33/806 |
| 2,529,931 | 11/1950 | Gallup, Sr. | 33/810 |
| 2,568,575 | 9/1951 | Wickman | 33/437 |
| 2,677,186 | 5/1954 | Sorensen | 33/143 M |
| 3,137,072 | 6/1964 | Terry | 33/DIG. 1 |
| 3,284,911 | 11/1966 | Clark | 33/427 |
| 3,289,307 | 12/1966 | Kelly | 33/143 M |
| 3,449,052 | 6/1969 | Rankin | 33/810 |
| 3,483,631 | 12/1969 | Bourgeois | 33/437 |
| 3,723,928 | 3/1973 | Blakey et al. | 33/DIG. 1 |
| 4,353,168 | 10/1982 | Ginggen | 33/795 |
| 4,459,749 | 7/1984 | Rieder et al. | 33/147 N |
| 4,553,327 | 11/1985 | Watanabe | 33/DIG. 1 |
| 4,566,199 | 1/1986 | Gruhler et al. | 33/810 |
| 4,570,349 | 2/1986 | Finkelman et al. | 33/784 |
| 4,612,656 | 9/1986 | Suzuki et al. | 33/784 |
| 4,741,108 | 5/1988 | Cohen | 33/143 M |
| 4,845,646 | 7/1989 | Marquis et al. | 33/784 |

FOREIGN PATENT DOCUMENTS

| | | | |
|---|---|---|---|
| 0901629 | 8/1965 | France | 33/810 |
| 2142144 | 1/1985 | United Kingdom | 33/143 M |

Primary Examiner—William A. Cuchlinski, Jr.
Assistant Examiner—C. W. Fulton
Attorney, Agent, or Firm—Ostrolenk, Faber, Gerb & Soffen

[57] ABSTRACT

The measuring apparatus consists of a stationary or mobile desk (8) having at least one aligning bar (9) for interaction with at least one of the measuring surfaces (2) of a measuring limb (3) of the sliding gage (7). At least one measuring surface (2) is outside the plane of the graduated straightedge (1), and at least one of the measuring limbs (3) has two limb parts (30) which project in two different directions from the graduated straightedge (1) parallel to the plane of the latter, and whose two measuring surfaces (2) are in a plane perpendicular to the graduated straightedge (1). Means for detachably fixing the aligning bar (9) and/or the object to be measured on the desk (8) may be provided. Preferably, both measuring limbs (3A, B) are displaceable on the graduated straightedge (1), and at least one of the two can be fixed.

25 Claims, 5 Drawing Sheets

APPARATUS FOR MEASURING DISTANCES ON A WORKPIECE, AND SLIDING GAGE DESIGNED FOR THE DIGITAL MEASUREMENT OF SUCH DISTANCES

This is a division of Ser. No. 07/116,394 filed Nov. 3, 1987, now abandoned.

BACKGROUND OF THE INVENTION

The invention relates to a measuring apparatus for measuring distances on a workpiece, having a sliding gage designed for digital measurement, and a holder for the workpiece. It also relates to a sliding gage designed for digital measurement, for an apparatus for measuring distances on a workpiece. Conventional measuring apparatuses for this purpose, in particular sliding gages, are as a rule positioned at an angle to the axis or surface of the workpiece to be measured, for example for determining the external dimensions of a sheet metal blank, hole diameters or hole spacings, etc. However, it is frequently found that the contact surfaces formed on the workpiece are not continuously flat, or are even at an angle to the axis or plane of the workpiece, or that the contact points are not defined when, for example, it is intended to determine the perpendicular distance of a hole from an edge. In addition, it is often desired to measure very different distances by means of a sliding gage having a long graduated straightedge. However, if a sliding gage of this type is used to measure relatively short distances, the weight of the projecting part of the graduated straightedge makes it difficult to obtain an exact adjustment manually.

It is therefore the object of the invention to design a measuring apparatus of this type, in particular a sliding gage, in such a way that the end points of the measured distance can be established exactly, even in the case of irregular and/or complex workpieces. This object is achieved by the features wherein the measuring surfaces (2) located on the two measuring limbs (3) of the sliding gage (7) are at least partially outside the plane of the graduated straightedge (1), and at least one of the measuring limbs (3) possesses two limb parts (30) which project in two different directions from the graduated straightedge (1) parallel to the plane of the latter, and whose two measuring surfaces (2) are in a plane perpendicular to the graduated straightedge (1), and wherein the holder consists of at least one stationary or mobile desk (8) having at least one aligning bar (9) for interaction with at least one of the measuring surfaces (2).

It is the further object of the invention to solve the problem of measuring short distances too by means of a long graduated straightedge. This object is achieved, according to the invention, by the sliding gage having two measuring limbs (3), each possessing a measuring surface (2), and a graduated straightedge (1) and a grip slide (4) which is connected to one of the measuring limbs (3B) and carries at least one means for digital tapping of measured values and an adjusting means (5) and a display (6), wherein both measuring limbs (3A, 3B) are displaceable on the graduated straightedge (1) and at least one (3A) of the two measuring limbs can be fixed. It is also achieved by providing at least one electrical connection (P) on the grip slide (4B) for transmitting measurement signals. Further advantageous embodiments of the invention are also described and/or claimed herein.

On the desk, a workpiece can be placed against the lateral surface of the aligning bar so that, for example, the perpendicular distance between a hole in the workpiece, at right angles to the desk surface, and the workpiece edge placed against the lateral surface of the aligning bar can be determined exactly by means of a sliding gage, which comes to rest against the lateral surface opposite the stated lateral surface of the aligning bar in such a way that its graduated straightedge is exactly perpendicular to the lateral surface of the aligning bar.

The advantages of the measures proposed according to the invention are evident from the following description, in which the invention is illustrated in more detail, and by way of example, with reference to the drawings.

BRIEF DESCRIPTION OF THE DRAWINGS

FIG. 3 shows a cross-section through the spacer in FIG. 2, FIG. 4 and 5 show inclined perspective views of two other different embodiments of the sliding gage according to the invention.

DETAILED DESCRIPTION

Figure 1:
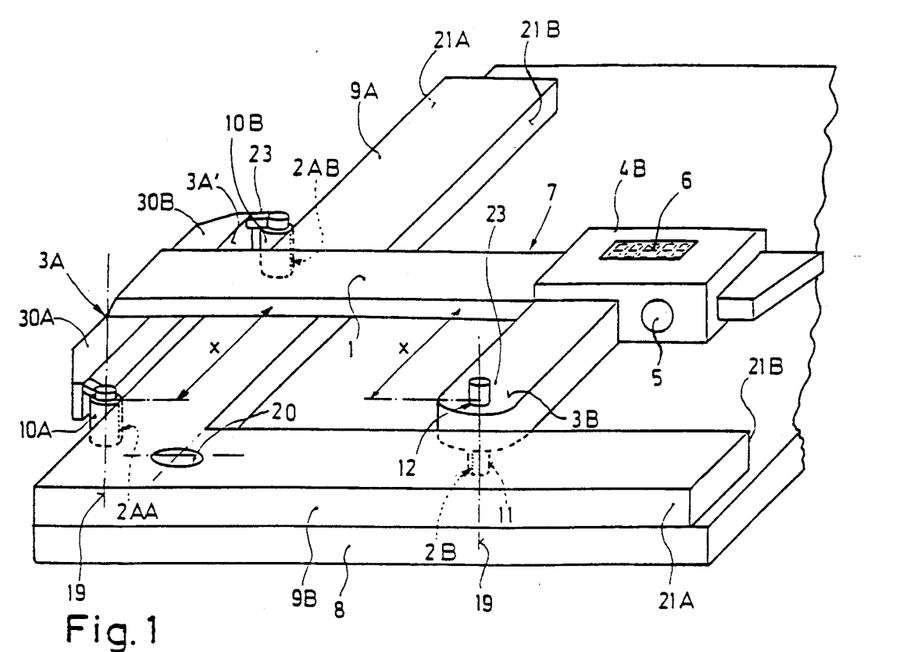
FIG. 1 shows an inclined perspective view of a measuring apparatus according to the invention.

In FIG. 1, a rectangular plate which is referred to below as the desk 8 and serves as a support or holder for a workpiece (not shown) is fastened, for example, to a table or trolley (likewise not shown), if necessary so that it can easily be detached. It can be in the form of an aligning plate but may also, for example, be transparent and therefore capable of being illuminated from below. Two aligning bars 9A, B are fastened along two adjacent edges of the desk 8, on one of the sides of the latter. The said bars may be fastened permanently or detachably, for example also by means of magnetic force. The lateral surfaces 21A, B of the aligning bars 9A, B are exactly parallel to one another. Where the expression "exact" is used in this description, it is to be understood as meaning the required precision or desired tolerance for the particular measuring task, or that which is achievable with the apparatuses used.

Above the aligning bar 9A is the graduated straightedge 1 of a sliding gage 7, on whose left-hand end—based on FIG. 1—a measuring limb 3A with its two limb parts 30A, B projecting beyond the graduated straightedge 1 is arranged. The two limb parts 30A, B carry rolls 10A, B which are intended to rest against the outer lateral surface 21A of the aligning bars 9A, B. Of course, instead of the rolls 10A, B, it is also possible for the surface 3A' of the limb 3A, which surface faces limb 3B, to be in the form of a measuring surface and intended to rest against the outer lateral surface 21A of the aligning bar 9A or even against the surface or edge of a workpiece to be measured.

However, the embodiment shown in FIG. 1 with rolls 10A, B having generating lines serving as measuring surfaces 2AA, AB (shown as points in cross-section) is preferred. The limb 3A may be fixed on the graduated straightedge, while the limb 3B is capable of traveling.

Preferably, however, the limb 3A is also capable of travelling (FIG. 4); this facilitates the measurement of small distances even by means of a sliding gage having a long graduated straightedge, since in this case the graduated straightedge does not overhang or project mainly on one side if the measurement can be carried out at least approximately in the middle of the graduated straightedge. For this reason, the sliding gage is also designed for digital measurement, because, in measurements of this type, it is necessary or at least particularly expedient to be able to zero the measurement display 6, for example by an adjusting means 5, in any desired position of the measuring limb 3B located on the grip slide 4B.

The two measuring surfaces 2AA, AB—in FIG. 1, also the limb parts 30A, B which support them—are located outside (in this case below) the plane of the graduated straightedge 1; in the example shown, in the plane of the aligning bar 9A, which is also the plane of a workpiece, for example a sheet metal blank, which is to be placed on the desk 8 and comes to rest against the inner lateral surfaces 21B of the aligning bars 9A, B. Here in particular, the embodiment, according to the invention, of a measuring apparatus which permits the sliding gage to be placed flat on a workpiece having a relatively large area very considerably improves the precision and the convenience of the measurement and of reading off the measured value. Previously, it was always necessary to carry out distance measurements on horizontally arranged flat workpieces using measuring limbs at right angles or at an angle to their surface. However, this led on the one hand to inaccuracies owing to undefined contact points and owing to any inaccuracies in a cut edge along its length, and on the other hand to tedious reading off in a direction of view parallel to the surface of the workpiece.

As mentioned above, the grip slide 4B is capable of travelling along the graduated straightedge 1, the means 6 for digital measurement and display of measured values and a zero-point setting means in the form of the adjusting means 5 also being located in the said slide. Furthermore, the grip slide 4B carries the measuring limb 3B, which is thus capable of travel, and in which at least one bearing 12 for holding a measuring finger 11 is present.

The central axes 19 of the roll 10A and of the measuring finger 11 are preferably located at the same perpendicular distance from the graduated straightedge 1. This makes it possible for the sliding gage 7 also to be used for conventional measurement of distances between the two measuring surfaces 2AA and 2B (the latter present on the measuring finger 11 and facing the former).

At the angle point of the two aligning bars 9A, B, a hole 20 is present perpendicular to their surface, the axis of the said hole being located in the extension of the inner lateral surface 21B of the aligning bar 9A. This permits, where necessary, calibration or adjustment of various rolls or measuring finger inserts for the subsequent measurement of hole spacings or distances in flat workpieces. The procedure for this will become clearer subsequently from the description of FIG. 4. There, the measuring surface 2B is formed on a conical measuring finger 11E. If the cone of the measuring finger 11E is placed in the hole 20 in such a way that a circumference line of the conical surface comes to rest against the upper edge of the hole 20 while the rolls 10C, D of the measuring limb 3C (which incidentally in this case is capable of travel but is fixed with the aid of the knurled screw 22A) rests against the outer lateral surface 21A of the aligning bar 9A (not shown in FIG. 4), the measurement display 6 can be set to zero with the aid of the adjusting means 5. When placed in various holes of a workpiece placed with one edge against the inner lateral surface 21B of the aligning bar 9A, the cone of the measuring finger 11E now measures the perpendicular distance between the center of the relevant hole and the contact edge of the workpiece or its enveloping line.

Figure 2:
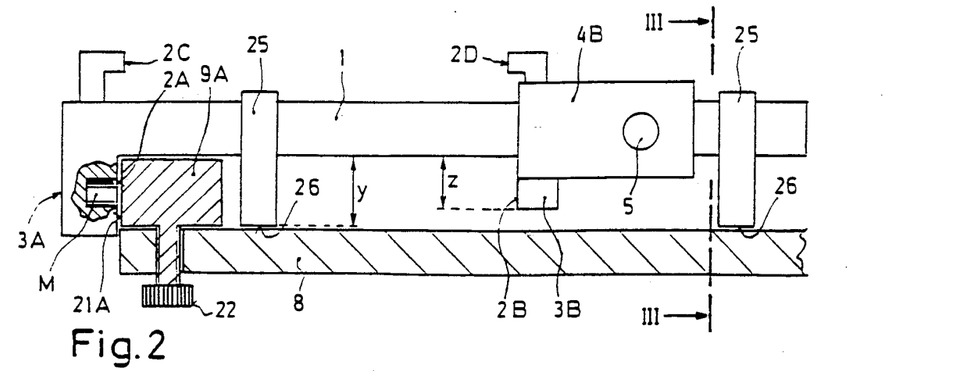
FIG. 2 shows a longitudinal section through the graduated straightedge of another embodiment of the invention.
Figure 3:
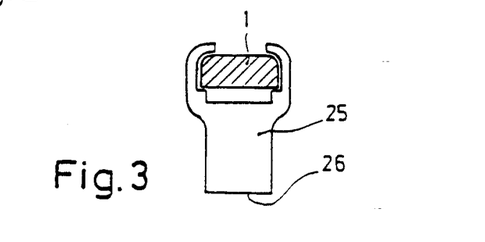

FIG. 2 and 3 show another embodiment of the invention. An aligning bar 9A is fastened on the desk 8 by means of knurled screws 22 projecting through the desk 8. A measuring limb 3A fixed to the left-hand end of the graduated straightedge 1 rests with its measuring surface 2A against the outer lateral surface 21A of the aligning bar 9A; the light gap shown serves merely for better understanding. Two spacers 25 which grip the graduated straightedge in a fork-like manner are displaceably arranged on the graduated straightedge, the lower contact surface 26 of the said spacers sliding on the surface of the desk 8. The spacers 25 hold the graduated straightedge 1 at a distance Y from the surface of the desk 8, this distance in every case being greater than the projection Z of the grip slide 4B and/or of the measuring limb 3B beyond the graduated straightedge 1 toward the surface of the desk 8. This facilitates measurement and improves the precision of the measurement by means of a sliding gage with a long graduated straightedge, even in the case of relatively short distances.

In addition to the measuring surfaces 2A, B projecting downward from the graduated straightedge 1, one upward-projecting measuring surface 2C, D is also located on each of the measuring limbs 3A, B shown in FIG. 2, the said measuring surface 2C, D permitting the sliding gage also to be used in a conventional manner when, for example, no rolls or measuring fingers are present as inserts in the measuring limbs.

It can be seen in FIG. 2 that at least one braking magnet M is located within, the measuring limb 3A. This magnet M interacts with the aligning bar 9A, which either consists completely of magnetic material or (for example where the aligning bar 9A is produced from plastic) carries a rail which faces the magnet M and consists of magnetizable material. This braking magnet M ensures on the one hand that the measuring limb 3A rests securely against the aligning bar 9A while at the same time the limb 3A is braked to prevent it from shifting unintentionally along the bar 9A, thus improving the accuracy of the measurement. Nevertheless, this magnet permits random shifting of the limb 3A along the aligning bar 9A. Of course, the reverse arrangement in which the magnet M is housed in the aligning bar 9A could also be employed, and it would likewise be possible to house weak magnets both in the limb 3A and in the aligning bar 9A. The magnet M could also be replaced by other fastening means or detachable fixing means, but it is evident that a magnet has the greatest advantages. Furthermore, a similar fixing means could also be used for fixing the aligning bar 9A to the desk 8 by a method in which, for example, a magnet in the aligning bar also faces the desk 8, if necessary in such a way that it simultaneously serves for braking the limb 3A. Magnets for fixing the workpiece can also be provided in the desk 8.

Figure 4:
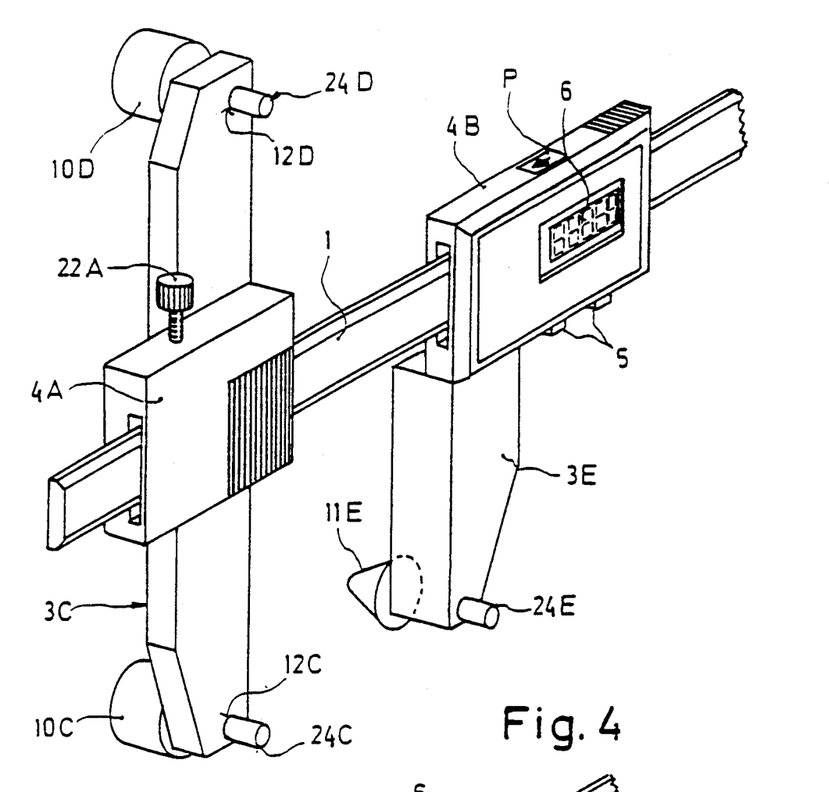

FIG. 4 in turn shows another embodiment of the invention. Here, the left measuring limb 3C, which is usually fixed, is capable of travel along the graduated straightedge 1 and is fastened to a grip slide 4A, which is capable of travel on the said straightedge but can be fixed in any position by means of the knurled screw 22A, in such a way that the said measuring limb lies in a plane which is parallel to the plane of the graduated straightedge 1 but is located a distance away from this plane. In contrast to FIG. 1, where the rolls 10A, B are held on the limb parts 30A, B by means of a bracket 23, the bearings 12C, D for holding the bearing journals 24C, D of the two rolls 10C, D are located directly in the two ends of the measuring limb 3C. Similarly, the measuring finger 11E, which is in the form of a cone here, has its bearing journal 24E at the end of the measuring limb 3E.

Figure 5:
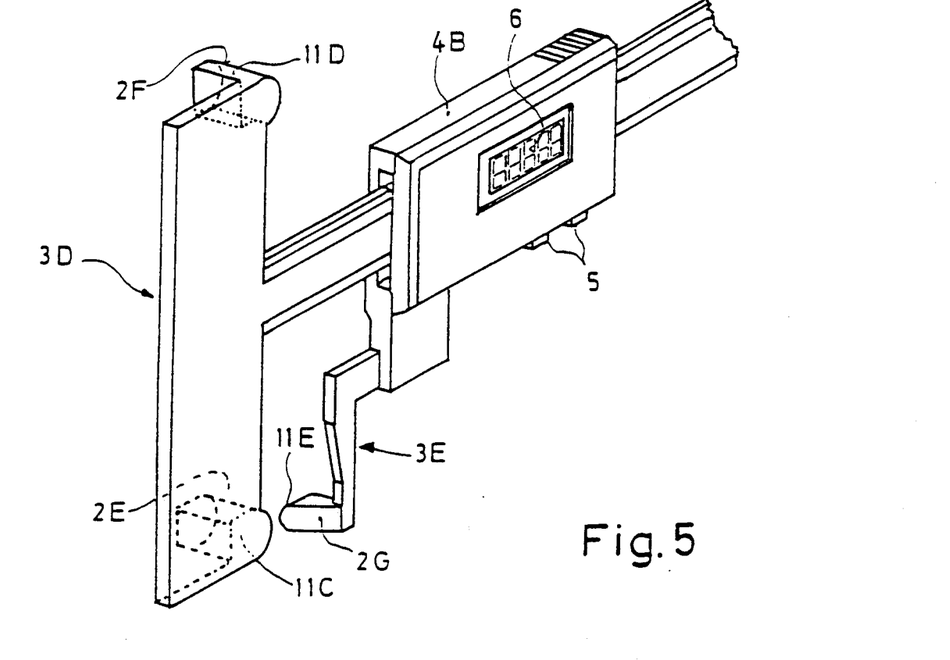

A simpler embodiment of the invention is described with reference to FIG. 5. Although the fixed measuring limb 3D is in the same plane as the graduated straightedge 1, the two measuring fingers 11C, D project from its ends into the region outside this plane and possess measuring surfaces 2E, F on their side which faces away from the end of the graduated straightedge. The measuring surface 2E interacts with the measuring surface 2G of the other measuring limb 3E, which is attached to the grip slide 4B. For the reasons mentioned above, the two measuring surface 2E, G are preferably located at the same perpendicular distance from the graduated straightedge 1.

Figure 6:
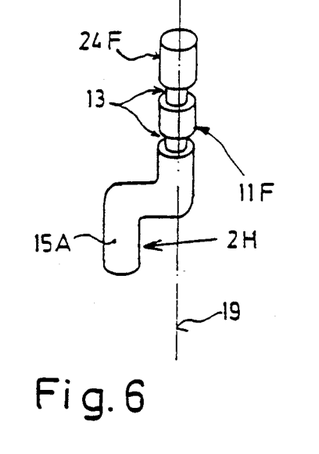
FIG. 6 to 12 show inclined perspective views of various embodiments of the measuring fingers or rolls to be used for the sliding gage according to the invention.

The crankshaft-like elbowed measuring finger 11F in FIG. 6 carries an eccentric measuring member 15A which has a measuring surface 2H and permits the measuring surface (or measuring line) 2H to be brought to rest against, for example, the measuring surface 2AA (FIG. 1) of the roll 10A and the apparatus to be adjusted in this position. The bearing journal 24F of the measuring finger 11F is provided with two circumferential grooves 13, by means of which the measuring finger 11F can be fixed in a bearing (not shown here) in a manner similar to that proposed in FIG. 9 or 10.

Figure 7:
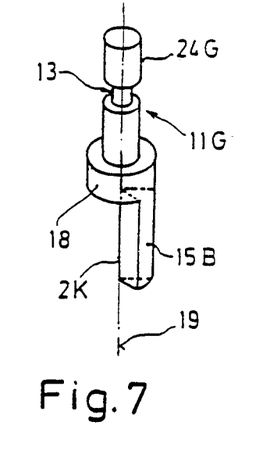

The measuring finger 11G in FIG. 7 has a bearing journal 24G with only one circumferential groove 13, the said bearing journal carrying an eccentric measuring member 15B in the form of a prismatic section, via a ring 18 of greater diameter. The said prismatic section possesses a measuring line 2K, which coincides with the axis 19 of the measuring finger 11G. It is evident that the measuring finger 11G can be brought to rest on measuring points from various directions by rotation about its axis 19.

Figure 8:
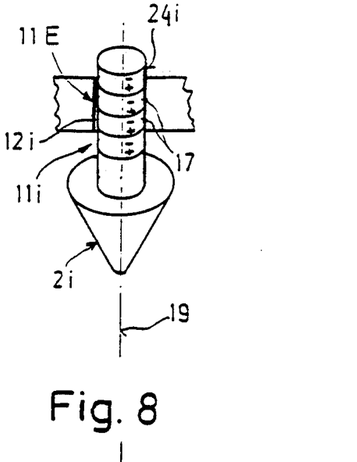

The form and mode of action of the cone envelope-like measuring surface 2*i* of the measuring finger 11*i* in FIG. 8 has already been described above in connection with FIG. 4. Here, it is merely necessary to point out the form of the bearing journal 24*i*, which consists of a plurality of permanent magnet disks 17 which fit as precisely as possible and with little friction in a bearing 12*i* (of one of the measuring limbs 3, which are not shown here). By pressing with the thumb from above, the cone can be lowered into a hole whose distance from another hole or from an edge is to be determined; if necessary, the bearing may be magnetized in the opposite sense to improve the retention and permit stepwise lowering.

Figure 9:
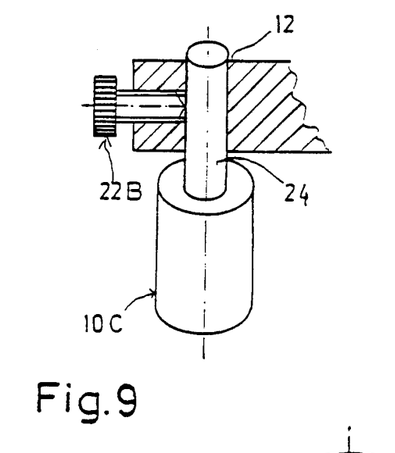
Figure 10:
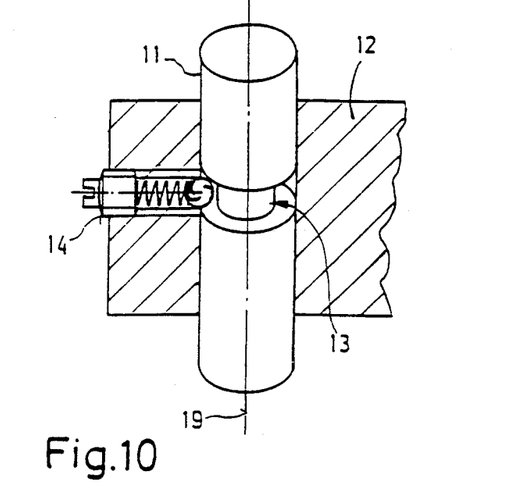

FIG. 9 shows a roll 10C whose bearing journal 24 sits in the bearing 12. A knurled screw 22B which passes through the bearing 12 fixes the bearing journal 24 at any height. The possibility of fixation at a particular height with the aid of a spring-loaded ball catch 14 which engages the circumferential groove 13 is shown in FIG. 10. This fixation is advantageous in particular for easy and rapid interchange of different measurement fingers.

Figure 11:
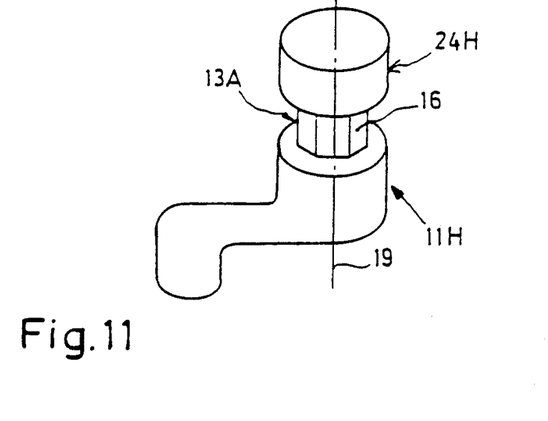

The bearing journal 24H of the measuring finger 11H in FIG. 11 has a circumferential groove 13A for interacting with a fixing means similar to that of FIG. 9 or 10; in this case, however, the groove base is provided with flat areas 16 which, when the measuring finger 11H is rotated about its axis 19, permit locking and hence fixing of the eccentric measuring member 15C at various angular positions, in a manner known per se.

Figure 12:
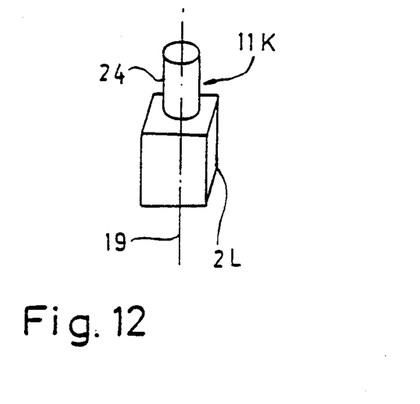

Finally, FIG. 12 shows a simplified embodiment of a measuring finger 11K having a bearing journal 24 and measuring surfaces 2L formed on four sides of a right parallelepiped.

The functioning of a preferred embodiment is described with reference to FIG. 13. An additional apparatus 31 which is connected to the electronics of the grip slide 4B by means of a plug contact P' (FIG. 13) which can be inserted into a socket P (FIG. 4) is preferably provided for this purpose. In principle, the additional apparatus 31 could be integrated in the grip slide, in which case plug connection P, P' would of course be dispensed with. However, it should be borne in mind that, as a result, the grip slide 4B would occupy somewhat more space and furthermore the accuracy of measurement could be adversely affected by operation of keys 32 to 35 mounted on the additional apparatus 31.

For these reasons, it is clear why it is preferable to provide an electrical connecting means P at the grip slide 4B in order to make it possible to connect a separate additional apparatus 31, which is fed, via a cable K, with the digital signals from the length measuring means housed in the grip slide 4B. On the other hand, the grip slide 4B may of course be designed without the display 6, since a similar display 106 is provided on the additional apparatus 31.

It will now be assumed that the workpiece W to be measured has two punched holes 38, 39 of different diameters and a projecting pin 40. If the left lateral edge of the workpiece W is in contact with the aligning bar 9A (FIG. 1), it is merely necessary initially to bring the measuring surface 2B of the measuring finger shown in FIG. 1 into the position 2B shown in FIG. 13, at the left-hand hole edge, along the horizontal central line of the latter. In this position, the key 33 which bears an appropriate symbol, on the apparatus 31 is pressed, whereupon the relevant length input via the cable K and read by the grip slide 4B from the straightedge 1 is stored in the memory of a microprocessor 36.

The measuring surface 2B (FIG. 1) is then guided to the position 2B' (FIG. 13), where it is brought into contact with the right-hand edge of the hole 38. The length determined in this manner is stored in the apparatus 31 by pressing the key 32. If it is then desired to obtain the distance X1 from the left lateral edge to the central line of the hole 38, the result key 35 is then pressed, this key selecting a mean value former in the microprocessor 36. From the two stored values for the positions 2B and 2B', the mean value former calculates the value corresponding to the position of the central line of the hole 38 and hence the distance X1.

A similar procedure is adopted in order to measure the distance X2 from the left edge of the workpiece W to the central line of the hole 39, the measuring surface 2B first being brought to the position 2B", the key 33 pressed, the measuring surface moved to the position 2B''' and the key 32 pressed. After key 35 has been pressed, the display 106 and/or the display 6 (FIG. 1, 4) indicates the calculated value X2, the microprocessor 36 selecting a driver stage 37 for the display 106. Of course, when an apparatus according to FIG. 1 is used, this apparatus to must be provided with a connection P (FIG. 4).

It is of course also possible to determine the diameter a of the hole 38 by bringing the measuring surface 2B into contact with the upper edge at the perpendicular central line, keeping the lower edge of the workpiece W against the aligning bar 9A and pressing the key 32. The measuring surface 2B is then placed against the lower edge of the hole 38 and the key 33 pressed. By depressing the key 34, the diameter a is displayed.

If, on the other hand, it is desired to determine an external diameter b of the pin 40, the measuring surface 2B is first brought to the position 2B/, the key 32 is pressed and then, after the measuring surface has been moved to position 2B//, the key 33 is pressed. When the result key 34 is pressed, the diameter b then appears, the design being such that the result appears on the display 106 only while the key is kept depressed, or remains visible on the display 106 for a predetermined time, via a timer in the microprocessor.

It is also possible continuously to determine adjacent lengths L1 to L5, for which purpose the microprocessor 36 is designed to go into this mode of operation when one of the keys 32 or 33 is kept depressed for a predetermined time, for example 3 seconds. The readiness of the microprocessor 36 for this mode of operation is then advantageously indicated on the display 106, for example by symbols appearing at regular intervals or in another manner. Another possible embodiment is one in which the relevant length L1, L2, L3 . . . L5 appears when only the measuring surface 2B is held at rest for a certain time on the relevant edge to be measured.

The latter mode of operation in particular shows that the keys 32 and 33 are not absolutely essential; instead, it may be sufficient, after a mode of operation is set or simply after the microprocessor 36 has been switched on, to bring the measuring surface into contact with the edges to be measured. It may be sufficient either to hold the measuring surface against the edge to be measured for a certain time or for the measuring surface or the entire finger 11 to be spring-mounted and, when brought into contact with an edge, itself to actuate a switch on the limb 3B, which corresponds to the key 32 or 33. However, in such an embodiment of the measuring surface 2B, there is the danger of unintentional actuation of the switch associated with it. Hence, the arrangement comprising the keys 32, 33 is more advantageous.

Figure 13:
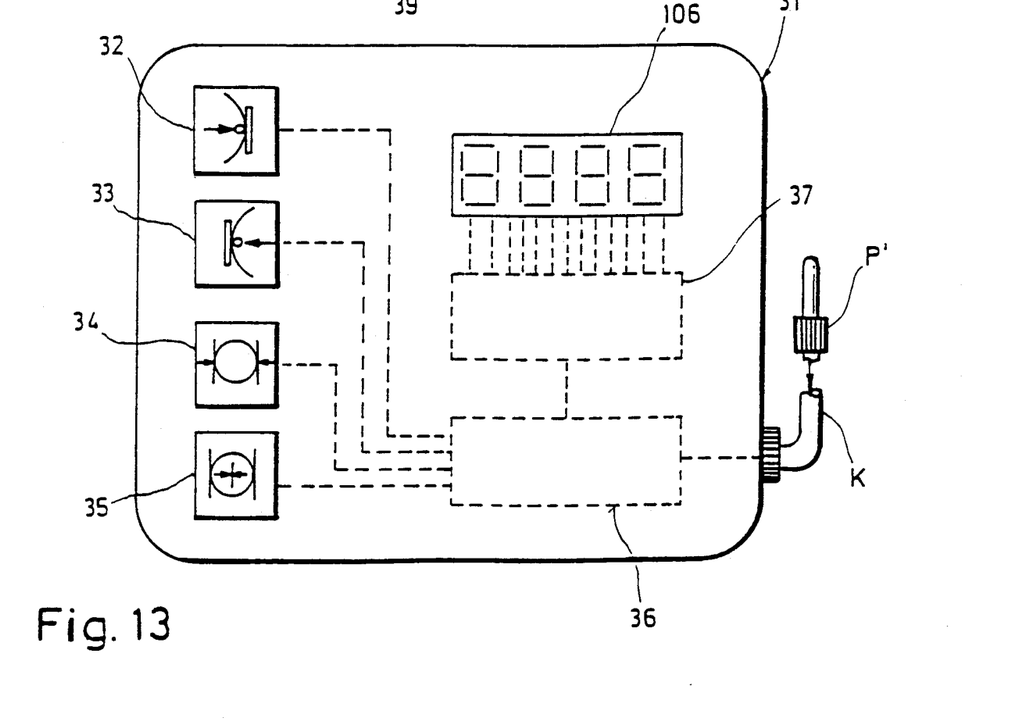
FIG. 13 is a diagram for illustrating the operation of the invention.
Figure 13A:
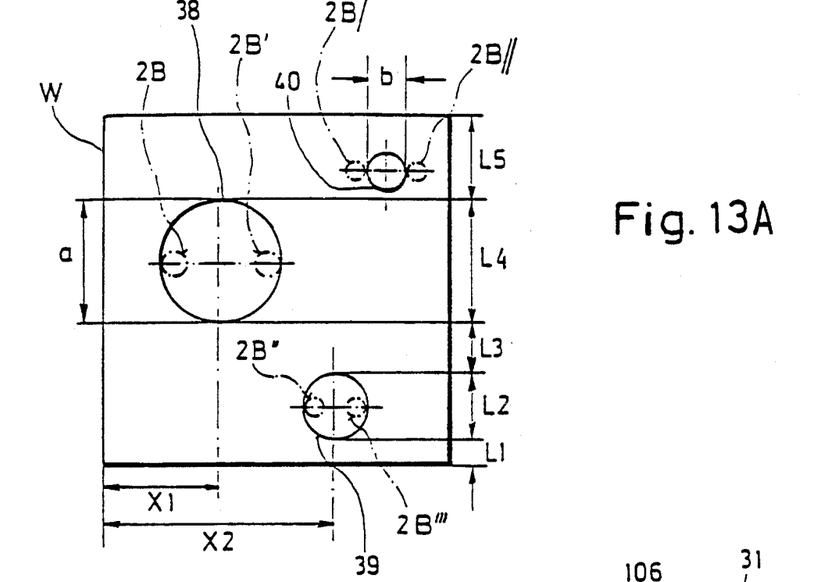
Figure 13B:
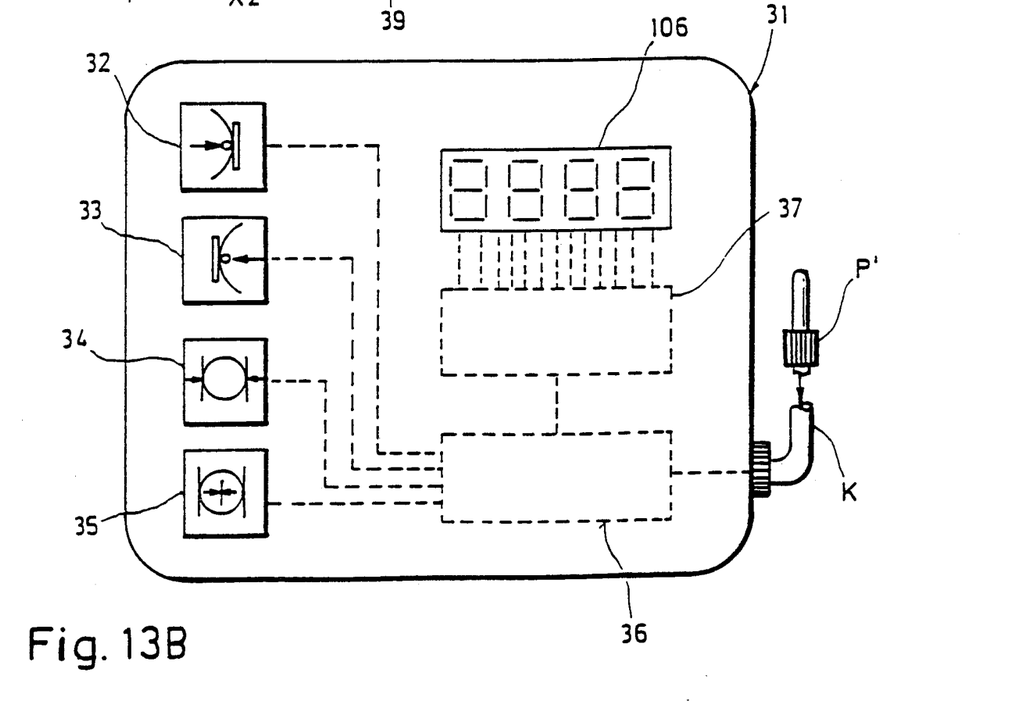

From the above description of FIG. 13, it is evident that, of course, a large number of other types of measurements on workpieces are possible, for example the measurement of the distance between the vertical central lines of the holes 38 and 39 by a method in which the central line of the hole 38 first determined in the manner described above is fixed as the new zero value in the microprocessor 36. For example, the programmed mode of operation of this microprocessor 36 may permit the length X1 or X2 to be read off from the display 106 after the key 32 or 33 which is pressed as the second key has been actuated, without the key 35 having to be pressed first. In this case, the key 35 can be used for fixing the new zero point in the measurement of distances between two central lines.

Another possible mode of operation comprises the determination of the distances between the right edges of the holes 38, 39. Here, it is possible to reduce the number of keys on the apparatus 31 if, when two keys are pressed simultaneously, for example the key 33 and the key 34, the microprocessor carries out the appropriate computation, although when the measuring surface 2B is brought into contact twice with a right (or left) edge of a workpiece the key 32 (or 33) must be pressed each time.

Another possibility is to combine the functions of the keys 32, 33 into a single input key, the computer relating the first value stored with the aid of this key to the relevant second value of this type.

The invention is not restricted to the examples described but may be modified in a wide variety of ways without departing from the principles according to the invention and while retaining the advantages achieved according to the invention. Thus, for example, the hole 20 can be reduced by concentric precision inserts for various cone envelope diameters; for measuring angular sheet components, at least one limb part may be rotatable with respect to the graduated straightedge; eccentric measuring members with various radial ranges and lengths, rolls of different diameters, measuring fingers of various shape and size may be provided in a set of inserts to meet the requirements of the particular measuring task to be carried out, all bearings 12 and bearing journals 24 expediently being identical and therefore interchangeable; finally, it is also possible to provide aligning bars of various heights, or exchangable measuring bars, for measuring workpieces of different heights, in which case it is also expedient to adapt the spacers 25 to the relevant height; instead of the knurled screw or the ball catch, any other conventional fastening means for the height and/or rotary position of the measuring finger can be used.

We claim:

1. Apparatus for measuring distances in a plane, between a plurality of edges, at least one of which is on a workpiece, said apparatus comprising:
   a) a straightedge;
   b) means for supporting said straightedge in a position parallel to said plane; including two measuring limbs attached to said straightedge, at least one of said limbs being capable of sliding on said straightedge;
   c) electronic digital means on said at least one slidable measuring limb and on said straightedge for providing a readout of a measurement, said electronic digital means comprising
      1) sensor means in said slidable measuring limb for sensing and outputting data representative of the position of said sensor along said straightedge;
      2) input means for selecting and inputting at least one reference value of said data representative of a reference position along said straightedge;
      3) a display; and
      4) computer means connected to said sensor means, said input means, and said display, being operable to calculate and control the display for displaying at least one measured distance between said reference position and a first one of said edges and further to display the mean value and the difference of two respective distances between said reference position and first and second ones of said edges;

d) one of said measuring limbs having two limb parts projecting in two different directions from said straightedge;

e) said two limb parts presenting a smooth first measuring face perpendicular to said plane and having means to magnetically and detachably adhere said two limb parts to a third one of said edges, thereby bringing said straightedge into a perpendicular position with respect to said third one of said edges; and f) measuring means projecting from the other of said measuring limbs along an axis perpendicular to said plane;

g) a second measuring face being formed on said measuring means and being movable into contact with said first and second ones of said edges and facing said first measuring face.

2. Apparatus as in claim 1, wherein at least one of said measuring faces is part of a cylinder having a radius of 0.001 to 0.05 mm, the axis of said cylinder extending perpendicularly to said plane, said measuring face being at said axis.

3. Apparatus as in claim 1, further comprising means to adjust said measuring means in different positions along said axis thereof.

4. Apparatus as in claim 1, wherein said measuring means is removable from said other one of said measuring limbs.

5. Apparatus as in claim 1, wherein at least one of said measuring faces projects radially beyond said axis of said measuring means.

6. Apparatus as in claim 1, further comprising at least one additional measuring means on each of said measuring limbs, said additional measuring means projecting away from said straightedge in a direction opposite to said measuring means.

7. Apparatus as in claim 1, wherein the computer means has at least one electrical connection operable for transmitting measurement signals.

8. Apparatus as in claim 1, further comprising a circuit arrangement within said computer means including a memory, to which, on the one hand, the sensor means and, on the other hand, the input means is connectable, said input means having at least one input key for selecting and storing a given measured distance.

9. Apparatus as in claim 1, further comprising a holder for the workpiece, said holder comprising at least one stationary or mobile desk having at least a first aligning bar disposed for contacting said third one of said edges and one of said measuring faces.

10. Apparatus as in claim 9, further comprising a second aligning bar perpendicular to said first aligning bar.

11. Apparatus as in claim 1, further comprising spacer means defining a distance (Y) between said straightedge and the desk or workpiece, said distance (Y) being greater than the projection (Z) of said measuring limbs beyond a graduated straightedge towards such desk or workpiece.

12. Apparatus for measuring the distance in a plane between first and second edges, at least one of which is on a workpiece, said apparatus comprising:

a) a straightedge;

b) means for supporting said straightedge in a position parallel to said plane; including first and second measuring limbs attached to said straightedge, at least one of said measuring limbs being capable of sliding on said straightedge;

c) electronic digital means mounted on said at least one slidable measuring limb and on said straightedge for providing a readout of a measurement; said electronic digital means comprising sensor means for sensing positions of said slidable measuring limb along said straightedge, a display, and computer means responsive to said sensor means to compute measurement values of said distance between said first and second edges based upon corresponding positions of said slidable measuring limb along said straightedge, and displaying said measurement values;

d) said first measuring limb having two limb parts projecting parallel to said plane in two different directions from said straightedge;

e) first and second measuring means associated with said two limb parts comprising at least one magnet which detachably fastens said limb parts to a third edge and said magnet having a surface which extends perpendicular to said plane;

f) said first and second measuring means having means for locating and keeping said straightedge in a position perpendicular to said third edge;

g) third measuring means projecting from said second measuring limb along an axis perpendicular to said plane;

h) a measuring face formed on each of said measuring means and movable into contact with a respective one of said edges, the measuring face on the third measuring means facing the measuring face on the first and second measuring means;

i) all said first, second and third projecting measuring means projecting in the same direction perpendicular to said plane and away from said straightedge;

13. Apparatus as in claim 12, wherein at least one of said measuring means has a measuring face which is part of a cylinder having a radius of 0.001 to 0.05 mm, an axis of said cylinder extending perpendicularly to said plane, said measuring face being at said axis.

14. Apparatus as in claim 12, further comprising means to adjust said third measuring means in different positions along said plane and said axis of said third measuring means.

15. Apparatus as in claim 12, wherein at least one of said measuring means is removable from at least one of said measuring limbs.

16. Apparatus as in claim 12, wherein at least one of said measuring means has a measuring face which projects radially beyond an axis of said measuring means.

17. Apparatus as in claim 12, wherein said first and second measuring means comprise a plurality of magnets which fasten said limb parts detachably to said edge.

18. Apparatus as in claim 12, further comprising at least one additional measuring means on each of said measuring limbs, said additional measuring means projecting away from said straightedge in a direction opposite to said first, second, and third measuring means.

19. Apparatus as in claim 12, wherein the computer means have at least one electrical connection operable for transmitting measurement signals.

20. Apparatus as in claim 12, further comprising a circuit arrangement within said computer means including a memory, to which the sensor means and at least one input apparatus is connectable, said input apparatus having at least one input key for selecting and storing a given measurement value.

21. Apparatus as in claim 12, further comprising a holder for the workpiece, said holder comprising at least one desk having at least a first aligning bar disposed for contacting one of said edges and one of said measuring means.

22. Apparatus as in claim 21, further comprising a second aligning bar perpendicular to said first aligning bar.

23. Apparatus for measuring the distance in a plane between two edges, at least one of which is on a workpiece, said apparatus comprising:
   a) a straightedge;
   b) means for supporting said straightedge in a position parallel to said plane; including first and second measuring limbs attached to said straightedge, at least one of said measuring limbs being capable of sliding on said straightedge;
   c) electronic digital means mounted on said at least one slidable measuring limb and on said straightedge for providing a readout of a measurement; said electronic digital means comprising sensor means for sensing positions of said slidable measuring limb along said straightedge, a display, and computer means responsive to said sensor means to compute measurement values of said distance between said two edges based upon corresponding positions of said slidable measuring limb along said straightedge, and displaying said measurement values;
   d) said first measuring limb having two limb parts projecting parallel to said plane in two different directions from said straightedge;
   e) first and second measuring means associated with said two limb parts comprising at least one magnet which detachable fastens said limb parts to said edge and said magnet having a surface which extends perpendicular to said plane;
   f) said first and second measuring means having means for locating and keeping said straightedge in a position perpendicular to one of said edges;
   g) third measuring means projecting from said second measuring limb along an axis perpendicular to said plane;
   h) a measuring face formed on each of said measuring means and movable into contact with a respective one of said edges;
   i) all said first, second and third projecting measuring means projecting in the same direction perpendicular to said plane and away from said straightedge; said third measuring means being rotatably mounted on said second measuring limb by means of a bearing journal and a bearing and having one measuring member located eccentrically to an axis of said bearing.

24. Apparatus for measuring the distance in a plane between two edges, at least one of which is on a workpiece, said apparatus comprising:
   a) a straightedge;
   b) means for supporting said straightedge in a position parallel to said plane; including first and second measuring limbs attached to said straightedge, at least one of said measuring limbs being capable of sliding on said straightedge;
   c) electronic digital means mounted on said at least one slidable measuring limb and on said straightedge for providing a readout of a measurement; said electronic digital means comprising sensor means for sensing positions of said slidable measuring limb along said straightedge, a display, and computer means responsive to said sensor means to compute measurement values of said distance between said two edges based upon corresponding positions of said slidable measuring limb along said straightedge, and displaying said measurement values;
   d) said first measuring limb having two limb parts projecting parallel to said plane in two different directions from said straightedge;
   e) first and second measuring means associated with said two limb parts comprising at least one magnet which detachable fastens said limb parts to said edge and said magnet having a surface which extends perpendicular to said plane;
   f) said first and second measuring means having means for locating and keeping said straightedge in a position perpendicular to one of said edges;
   g) third measuring means projecting from said second measuring limb along an axis perpendicular to said plane;
   h) a measuring face formed on each of said measuring means and movable into contact with a respective one of said edges;
   i) all said first, second and third projecting measuring means projecting in the same direction perpendicular to said plane and away from said straightedge; wherein at least one of said measuring means is a measuring finger rotatably mounted in a bearing, said measuring finger having a member which bears a measuring face flush with an axis of said bearing.

25. Apparatus for measuring the distance in a plane between two edges, at least one of which is on a workpiece, said apparatus comprising:
   a) a straightedge;
   b) means for supporting said straightedge in a position parallel to said plane; including first and second measuring limbs attached to said straightedge, at least one of said measuring limbs being capable of sliding on said straightedge;
   c) electronic digital means mounted on said at least one slidable measuring limb and on said straightedge for providing a readout of a measurement; said electronic digital means comprising sensor means for sensing positions of said slidable measuring limb along said straightedge, a display, and computer means responsive to said sensor means to compute measurement values of said distance between said two edges based upon corresponding positions of said slidable measuring limb along said straightedge, and displaying said measurement values;
   d) said first measuring limb having two limb parts projecting parallel to said plane in two different directions from said straightedge;
   e) first and second measuring means associated with said two limb parts comprising at least one magnet which detachable fastens said limb parts to said edge and said magnet having a surface which extends perpendicular to said plane;
   f) said first and second measuring means having means for locating and keeping said straightedge in a position perpendicular to one of said edges;
   g) third measuring means projecting from said second measuring limb along an axis perpendicular to said plane;

h) a measuring face formed on each of said measuring means and movable into contact with a respective one of said edges;
i) all said first, second and third projecting measuring means projecting in the same direction perpendicular to said plane and away from said straightedge;

further comprising spacer means defining a distance (Y) between said straightedge and the desk or workpiece, said distance (Y) being greater than a projection (Z) of said third measuring limb beyond the straightedge toward such desk or workpiece.

* * * * *